United States Patent
Lee

(10) Patent No.: US 11,917,075 B2
(45) Date of Patent: Feb. 27, 2024

(54) MULTI-SIGNATURE SECURITY ACCOUNT CONTROL SYSTEM

(71) Applicant: PAY GATE CO., LTD., Seoul (KR)

(72) Inventor: Dong-San Lee, Seoul (KR)

(73) Assignee: PAY GATE CO., LTD., Seoul (KR)

( * ) Notice: Subject to any disclaimer, the term of this patent is extended or adjusted under 35 U.S.C. 154(b) by 446 days.

(21) Appl. No.: 17/254,445

(22) PCT Filed: Jun. 28, 2019

(86) PCT No.: PCT/KR2019/007927
§ 371 (c)(1),
(2) Date: Dec. 21, 2020

(87) PCT Pub. No.: WO2020/005034
PCT Pub. Date: Jan. 2, 2020

(65) Prior Publication Data
US 2021/0273814 A1 Sep. 2, 2021

(30) Foreign Application Priority Data
Jun. 28, 2018 (KR) .................. 10-2018-0075039

(51) Int. Cl.
*H04L 9/32* (2006.01)
(52) U.S. Cl.
CPC .................. *H04L 9/3247* (2013.01)
(58) Field of Classification Search
None
See application file for complete search history.

(56) References Cited

U.S. PATENT DOCUMENTS

| | | | |
|---|---|---|---|
| 9,965,805 B1* | 5/2018 | Winklevoss | G06Q 40/04 |
| 2006/0123465 A1* | 6/2006 | Ziegler | H04L 63/0861 726/2 |
| 2014/0250008 A1 | 9/2014 | Dundas et al. | |

(Continued)

FOREIGN PATENT DOCUMENTS

| | | |
|---|---|---|
| KR | 10-2012-0108599 A | 10/2012 |
| KR | 10-2018-0041043 A | 4/2018 |

(Continued)

OTHER PUBLICATIONS

Singapore Office Action dated Jun. 28, 2022, in counterpart Singapore Patent Application No. 11202012708S (11 pages in English).

(Continued)

*Primary Examiner* — Jeffrey C Pwu
*Assistant Examiner* — Mayasa A. Shaawat
(74) *Attorney, Agent, or Firm* — NSIP Law

(57) ABSTRACT

Disclosed is a multi-signature security account control system. The present invention comprises a multi-signature security account in which at least three participating accounts have management authority, wherein the participating accounts are a first participating account corresponding to a user terminal, a second participating account corresponding to an HSM management server, and a third participating account corresponding to an exchange server, and the HSM management server may control the authority of the multi-signature security account to be controlled by using signature information provided from at least two of the participating accounts.

4 Claims, 4 Drawing Sheets

(56) References Cited

U.S. PATENT DOCUMENTS

2015/0324789 A1    11/2015  Dvorak et al.
2017/0154331 A1*   6/2017   Voorhees .............. H04L 9/3255
2018/0068280 A1*   3/2018   Micali .................... G06Q 20/29

FOREIGN PATENT DOCUMENTS

WO    WO 2016/156954 A1    10/2016
WO    WO 2018/020376 A1     2/2018
WO    WO-2018020376 A1 *    2/2018  ............. F01D 5/066

OTHER PUBLICATIONS

International Search Report dated Oct. 10, 2019 in counterpart International Patent Application No. PCT/KR2019/007927 (2 pages in English and 2 pages in Korean).

\* cited by examiner

MULTI-SIGNATURE SECURITY ACCOUNT CONTROL SYSTEM

CROSS REFERENCE TO RELATED APPLICATIONS

This application is a U.S. National Stage Application of International Application No. PCT/KR2019/007927, filed on Jun. 28, 2019, which claims the benefit under 35 USC 119(a) and 365(b) of Korean Patent Application No. 10-2018-0075039, filed on Jun. 28, 2018, in the Korean Intellectual Property Office, the entire disclosure of which is incorporated herein by reference for all purposes.

TECHNICAL FIELD

The present disclosure relates to a multi-signature security account control system. More specifically, the present disclosure relates to a multi-signature security account control system for managing control and recovery of an account by controlling management authority for the account through a plurality of account signatures and maintaining the security of the account in order to exercise management authority for a certain account if signature is performed for a predetermined number of participating accounts or more, among at least three participating accounts having management authority for a certain account.

BACKGROUND ART

Cryptocurrency is a type of electronic money that remains in the form of information in a computer or the like, and is traded virtually only in cyberspace.

Initially, cryptocurrency was called "digital currency" or "virtual currency" because it is not visible and is realized only in computers, but nowadays it is also referred to as "cryptocurrency" in the sense of currency employing encryption technology.

Cryptocurrency is able to significantly reduce transaction costs such as transfer costs and the like because production costs are not incurred when issuing currency. In addition, since cryptocurrency is network-type electronic money that is only traded in cyberspace without real objects, there is no limit as to the number of coins that may be held.

In addition, cryptocurrency enables direct transactions because intermediate steps for transaction are not required.

As examples of cryptocurrencies, there are "Bitcoin", which is the representative thereof, "Ethereum", "Eos", "Litecoin", "Neo", "Monero", "Dash", and the like.

Such cryptocurrency is driven in a block chain system, which is a decentralized ledger record database technology for recording cryptocurrency transactions.

All cryptocurrencies are configured as a pair of keys in the form of a private key and a public key (address) at a user end.

For example, the public key corresponds to a bank account number, and the private key corresponds to a password, which are a pair of keys that match each other.

In general, a cryptocurrency QT program (personal user wallet program) encrypts a private key using a user password and stores the same in a user terminal such as a member computer or the like.

A cryptocurrency exchange encrypts the private key using a user password or salt in a server and then stores the same in an exchange server.

However, the conventional configuration for storing user information has a potential problem in which the encrypted private key stored in the exchange server may be decrypted by hacking or insiders related to the security of the exchange who knows how to encrypt the key, thereby illegally transferring assets from the user's account.

That is, since the conventional technology is configured to control whether or not to transfer assets and the authority for the account using a single password, there is a problem in which the account cannot be used in the case of hacking.

In addition, even if the user has a wallet, since the management authority for the user's account relies on the exchange, instead of being given to the user, hacking into the exchange may cause significant damage.

Further, if the user loses or damages the private key for a wallet, it is impossible to exercise management authority for the account or to recover the same so that valuable assets may be completely lost.

DETAILED DESCRIPTION OF THE INVENTION

Technical Problem

In order to solve the above problems, an objective of the present disclosure is to provide a multi-signature security account control system for managing control and recovery of an account by controlling the management authority for the account through a plurality of account signatures and maintaining the security of the account in order to exercise management authority for a certain account if signature is performed for a predetermined number of participating accounts or more, among at least three different accounts having management authority for a certain account.

Technical Solution

In order to attain the objective described above, an embodiment of the present disclosure provides a multi-signature security account control system including a multi-signature security account in which at least three participating accounts have management authority, wherein the participating accounts includes a first participating account corresponding to a user terminal, a second participating account corresponding to an HSM management server, and a third participating account corresponding to an exchange server.

In addition, the multi-signature security account control system according to an embodiment of the present disclosure causes the HSM management server to control authority for the multi-signature security account using signature information provided from a predetermined number of participating accounts or more.

In addition, the authority of the multi-signature security account according to an embodiment of the present disclosure is at least one of transfer of assets, delegation of authority for transfer of assets and change of configuration/cancellation of delegation, producer voting, checking balances, displaying a transaction list, obtaining bid information, purchase and sale of goods, permission control, submission/execution of proposals, and review/approval/rejection of proposals.

In addition, in the multi-signature security account according to an embodiment of the present disclosure, each participating subject maintains ownership, and the shares of the multi-signature security account are determined through the weights held by the participating subjects.

In addition, the multi-signature security account according to an embodiment of the present disclosure is configured to, if any one of a plurality of participating accounts is attacked, switch the authority of the attacked account to a new participating account through authentication of the remaining participating accounts.

In addition, the multi-signature security account system according to an embodiment of the present disclosure includes an offline HSM (hardware security module) configured to generate a private key and a public key offline for the second participating account of the multi-signature security account in which at least three participating accounts have management authority.

In addition, the multi-signature security account system according to an embodiment of the present disclosure includes an HSM management server configured to receive the generated private key and public key from the offline HSM, store the private key in the database, generate a KeK (key encryption key) and data key (DK), encrypt the data key using the KeK (key encryption key), and store the same in the database.

In addition, the HSM management server outputs and transmits signature information encrypted using the data key to the user terminal or the exchange server.

In addition, the multi-signature security account system according to an embodiment of the present disclosure includes a database configured to store the encrypted private key, the KeK, and the data key (DK), In addition, the HSM management server according to an embodiment of the present disclosure configures a multi-signature security account in which the second participating account, the first participating account of the user terminal 100 and the third participating account of the exchange server have management authority, and controls the authority of the multi-signature security account through authentication of multi-signature information.

In addition, if any one of the first participating account or the third participating account is attacked (or hacked), the HSM management server according to an embodiment of the present disclosure performs control so as to switch the authority of the attacked account to a new account through a predetermined verification process.

Advantageous Effects

According to the present disclosure, management authority for a certain account is able to be exercised by providing signatures for a predetermined number of participating accounts or more, among at least three participating accounts having management authority for a certain account. Therefore, it is possible to manage control and recovery of an account by controlling the management authority for the account through a plurality of account signatures, thereby improving the security of the account.

In addition, according to the present disclosure, even if some information on an account is leaked by hacking or the like, recovery of a security account is able to be performed through multiple signatures, which may be applied to various cryptocurrency transactions.

MODE FOR CARRYING OUT THE INVENTION

Figure 1:
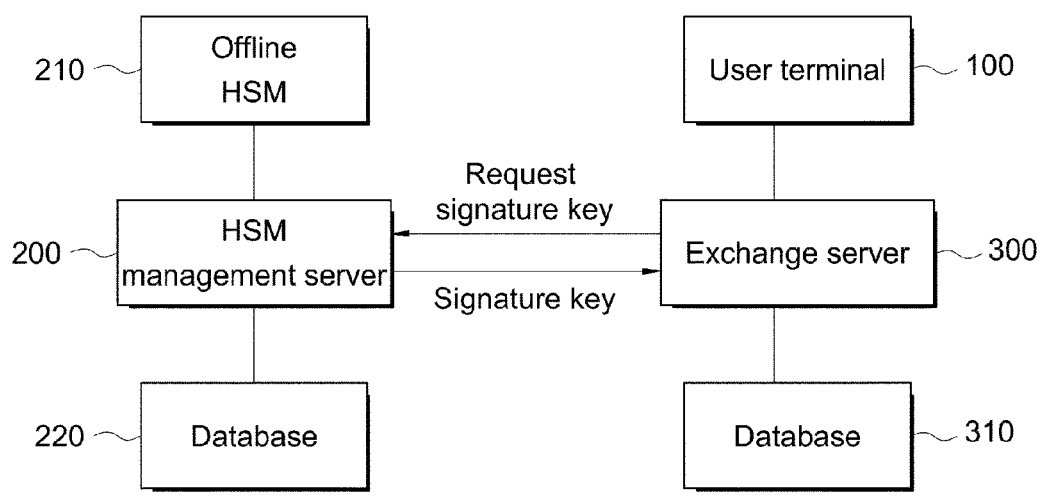
FIG. 1 is a block diagram showing the configuration of a multi-signature security account control system according to an embodiment of the present disclosure.
Figure 2:
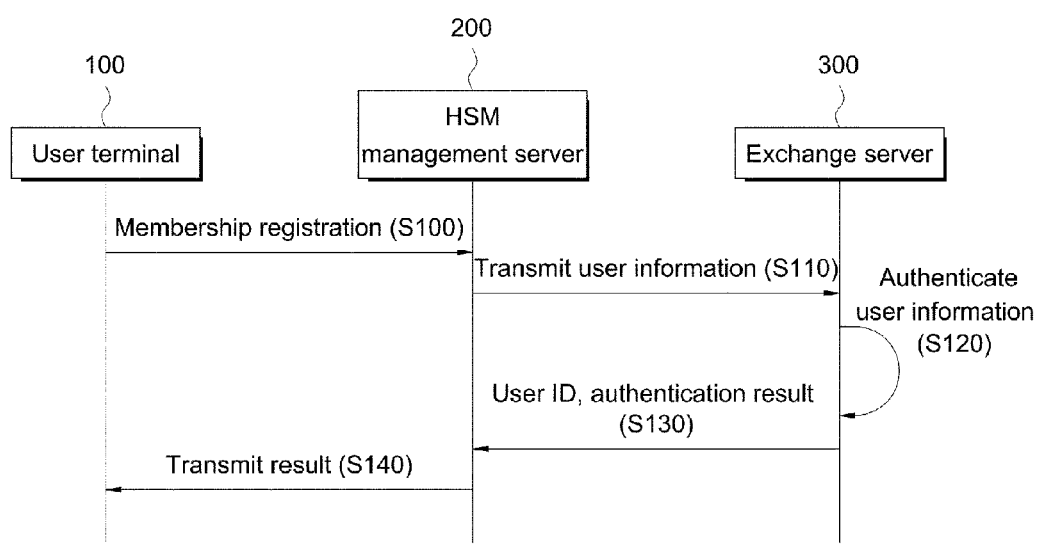
FIG. 2 is a flowchart showing the operation of a multi-signature security account control system according to an embodiment of the present disclosure.
Figure 3:
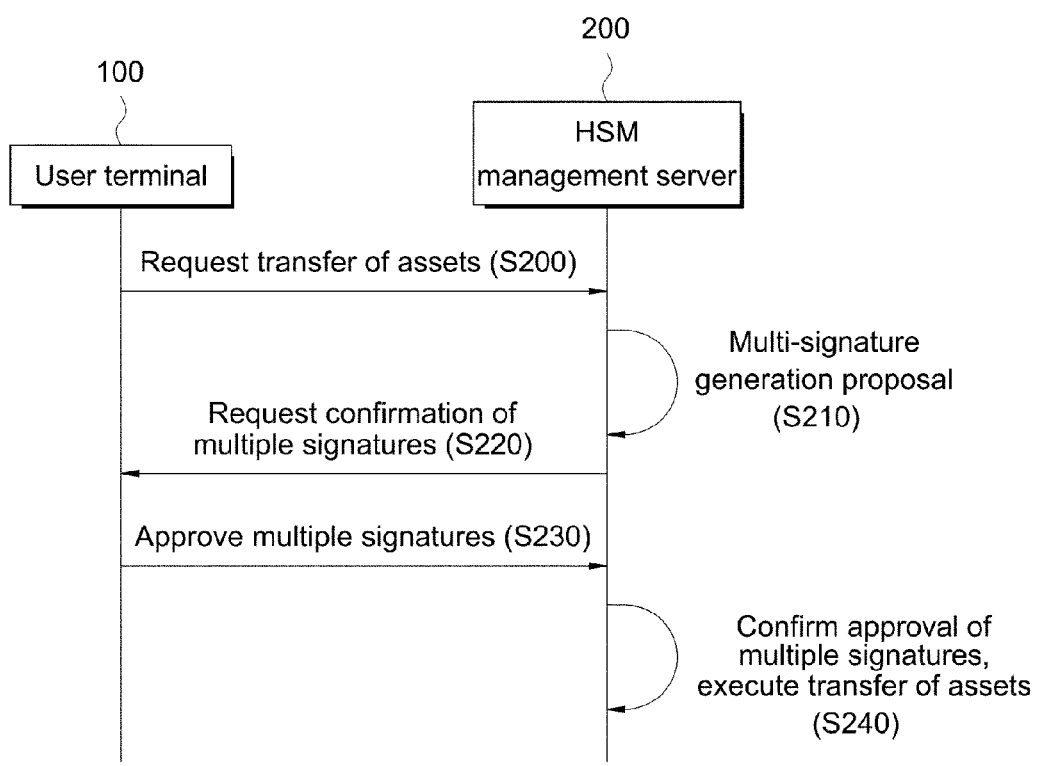
FIG. 3 is another flowchart showing the operation of a multi-signature security account control system according to an embodiment of the present disclosure.
Figure 4:
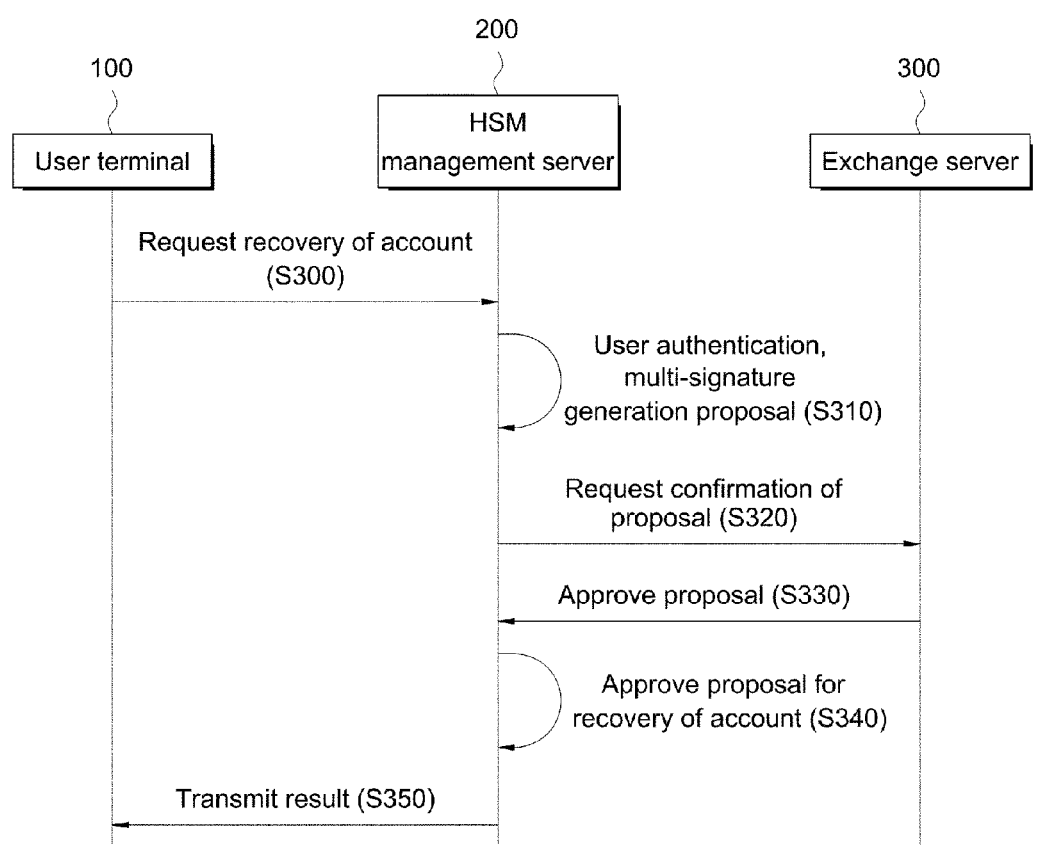
FIG. 4 is a flowchart showing recovery of an account in a multi-signature security account control system according to an embodiment of the present disclosure.

FIG. 1 is a block diagram showing the configuration of a multi-signature security account control system according to an embodiment of the present disclosure, FIG. 2 is a flowchart showing the operation of a multi-signature security account control system according to an embodiment of the present disclosure, FIG. 3 is another flowchart showing the operation of a multi-signature security account control system according to an embodiment of the present disclosure, and FIG. 4 is a flowchart showing recovery of an account in a multi-signature security account control system according to an embodiment of the present disclosure.

As shown in FIGS. 1 to 4, a multi-signature security account control system according to an embodiment of the present disclosure is configured to include a multi-signature security account in which at least three participating accounts have management authority, and a user terminal 100, an HSM management server 200, and an exchange server 300, which have a participating account, respectively.

Here, the "account" may indicate a "wallet" used to trade cryptocurrency. Accordingly, the participating accounts of the user terminal 100, the HSM management server 200, and the exchange server 300 also have their own wallets for trading cryptocurrency, and the wallet is called a "participating account". An account for cryptocurrency transactions in which each participating account has management authority for one certain account is called a "multi-signature security account".

Here, the term "multi-signature security account" connotes that multi-signature technology for security of an account is applied thereto. The security of an account may encompass any process of protecting the account from being changed by an unauthorized person.

"Multi-signature" indicates that a plurality of signatures, instead of a single signature, is used. That is, it is assumed that there is a plurality of subjects providing signatures, instead of a single subject. Accordingly, "multi-signature" means that signatures are provided by the respective subjects for a specific authentication. Therefore, each of the signature subjects has management authority for a certain account.

Accordingly, each of the user terminal 100, the HSM management server 200, and the exchange server 300 may become a subject for signature, and may exercise management authority for a certain account.

The user terminal 100, the HSM management server 200, and the exchange server 300 are referred to as "participating accounts" capable of exercising management authority in the sense that they participate in exercising management authority for a certain account.

The share or weight with which each participating account is able to exercise management authority for a certain account may be appropriately determined by mutual agreement as necessary.

In addition, a reference value is provided in exercising management authority for the account, and if signature exceeding the reference value is performed by each participating account, the management authority for the account may be exercised.

In addition, the multi-signature security account control system causes the HSM management server 200 to control the authority for the multi-signature security account using multi-signature information (e.g., a signature key) provided from at least two participating accounts.

The authority for the multi-signature security account includes authority for at least one of transfer of assets, delegation of authority for transfer of assets and change of configuration/cancellation of delegation, producer voting, checking balances, displaying a transaction list, obtaining bid information, purchase and sale of goods, permission control, submission/execution of proposals, and review/approval/rejection of proposals.

The user terminal 100 is connected to the exchange server 300 through a network and manages a first participating account having management authority for the multi-signature security account.

In addition, the user terminal 100 may be configured as any of various terminals such as a desktop PC, a notebook PC, a tablet PC, a palmtop, a personal digital assistant (PDA), a communication terminal device such as a smartphone capable of accessing to the Internet, a portable multimedia player (PMP), an ultra-mobile PC (UMPC), a mobile internet device (MID), and the like.

In addition, the user terminal 100 may request tasks, such as transfer of assets stored in the multi-signature security account, delegation of authority for transfer of assets and change of configuration/cancellation of delegation, producer voting, checking balances, displaying a transaction list, obtaining bid information, purchase and sale of goods, permission control, submission/execution of proposals, review/approval/rejection of proposals, and the like, through the first participating account.

In addition, if the first participating account is attacked (or hacked), the user terminal 100 requests the HSM management server 200 to switch the authority to a new first participating account due to the attack.

The HSM (hardware security module) management server 200 generates and manages a multi-signature security account in which at least three participating accounts have management authority, wherein the participating accounts include a first participating account generated by the user terminal 100, a second participating account corresponding to the HSM management server 200, and a third participating account corresponding to the exchange server 300.

That is, the multi-signature security account is an account in which a plurality of participating accounts has management authority in order to manage an increase or reduction in assets for an account generated using a public key, and is an account that may be configured by dividing ownership according to the shares of the participating accounts.

In addition, the multi-signature security account may be used for control of corporate financial accounts, control of financial accounts of clubs, NGOs, or the like, P2P fund protection, sales protection trade, control of use of blockchain, and the like.

In addition, in the multi-signature security account, the respective participating subjects, that is, the first participating account, the second participating account, and the third participating account, maintain ownership, and the shares of the multi-signature security account may be determined through the weights of the assets and the like, which are held by the participating subjects of the first participating account, the second participating account, and the third participating account.

In addition, the multi-signature security account may be protected by insurance.

The HSM management server 200 is configured to include an offline HSM (hardware security module) 210 and a database 220.

The offline HSM 210 generates a private key and a public key offline for the multi-signature security account including at least three participating accounts generated by different users.

The private key generated by the offline HSM 210 is encrypted and stored in the database 220 of the HSM management server 200 or in an external database in order to prevent leakage thereof to the outside, thereby safely protecting and managing the same.

The HSM management server 200 receives the private key and public key generated by the offline HSM 210 through separate storage such as a USB memory or the like, and the private key is encrypted and stored in the database 220. The public key is open and generated as a multi-signature security account including at least three participating accounts by the HSM management server 200.

In addition, the HSM management server 200 may manage an authentication encryption key management solution, cloud computing, networking, payment, security, and storage.

In addition, the HSM management server 200 generates a KeK (key encryption key) and a data key (DK), and the data key is encrypted using the KeK (key encryption key) and is then stored in the database 220.

In addition, the HSM management server 200 generates a signature key by encrypting data including signature information using a data key (DK).

In addition, the HSM management server 200 provides the signature key to, for example, the first participating account, the second participating account, and the third participating account, which constitute the multi-signature security account, so as to be used for transfer of assets, approval of change in authority, and the like, thereby preventing the private key stored in the HSM management server 200 from being leaked to the outside.

In addition, the HSM management server 200 allows the KeK to be protected inside the HSM based on the HSM, and allows the KeK to be protected in the offline HSM 210.

In addition, the data key is generated in a volatile memory of the HSM, and is used for encryption of the private key.

In addition, the data key is encrypted using the KeK public key and is then stored in the database 220 for key recovery in an emergency, and the unencrypted data key resides only in the memory of the HSM.

In addition, the HSM management server 200 configures a multi-signature security account such that at least three different accounts, that is, the second participating account of the HSM management server 200, the first participating account of the user terminal 100, and the third participating account of the exchange server 300, have management authority.

In addition, the HSM management server 200 performs a contract and registration process such as securing confidentiality between the first participating account, the second participating account, and the third participating account, and performs use of an administrator API, exchange of a shared secret key, and allocation of a GUID (global unique ID) to each user of the account.

In addition, the HSM management server 200 adds user information to the GUID for each user, and allows the key mapped to the GUID for each user to be protected in the HSM or an application to which a security system similar thereto is applied.

In addition, the HSM management server 200 controls the authority of the multi-signature security account through multi-signature information on two or more of three accounts, that is, through authentication of a signature key.

In the multi-signature security account, transfer of assets from the multi-signature security account or change in the authority configured in the multi-signature security account is not to be performed using only authority having a sum of shares less than a predetermined threshold on the basis of the shares allocated to the first participating account, the second participating account, and the third participating account, and the sum of the shares of the respective accounts.

That is, in the case where a threshold for approving transfer of assets for the multi-signature security account (the sum of shares) is, for example, "50", and where the share of the first participating account is "40", the share of the third participating account is "30", and the share of the second participating account is "30", if a signature key is provided from at least two or more accounts for transfer of assets from the multi-signature security account, and if the sum of shares exceeds "50", approval of the transfer of assets and transfer according to thereto may be performed.

Meanwhile, although a description has been made on the basis of three participating accounts for convenience of explanation in the present embodiment, the disclosure is not limited thereto, and more than three participating accounts may be configured as necessary. For example, if five participating accounts are configured, signature information must be input from at least three participating accounts.

In addition, the HSM management server 200 enables the multi-signature security account to be recovered through multiple signatures in the case of a problem such as an attack or hacking.

That is, the HSM management server 200 uses the first participating account+the third participating account for general business, uses the first participating account+the second participating account when the third participating account is attacked (or hacked), and uses the third participating account+the second participating account with two signatures when the first participating account is attacked (or hacked).

In addition, if any one of the first participating account or the third participating account is attacked (or hacked), the HSM management server 200 switches the authority from the attacked account to a new account through a predetermined verification process using two signatures.

Meanwhile, if the first participating account of the multi-signature security account is attacked, transfer of assets or tokens is impossible using a single account, and recovery of the first participating account may be requested through the third participating account or the second participating account.

At this time, after identifying a user, the HSM management server 200 performs change into a new first participating account and recovery of the authority with respect to the new account through confirmation of a user's intention by user authentication.

The user identification process may include identification using a predetermined user's passport, bank account information, and the like, and identification using international financial transaction restrictions and information on major politicians.

In addition, the HSM management server 200 may execute user authentication in relation to the first participating account through session authentication, authentication using SMS-MO/OTP/ARS, user identification (KYC) account authentication, and the like, instead of managing a user's password therefor and the like, and may apply other authentication methods depending on the security level.

In addition, the HSM management server 200 may perform authentication in relation to the third participating account through shared security key authentication, SMS-MO/ARS/Soft-OTP, or the like.

In addition, the HSM management server 200 may perform verification using the remitter's account number and the one-time amount of money, and may identify user's consent to the change of authority to a new account by requesting the user to remit the amount of money (e.g., KRW 1), which was remitted to the user for verification, to a virtual account designated by an administrator.

In addition, this configuration may be suitable for companies to which internal control is applied.

The database 220 encrypts and stores the private key, the KeK, the data key (DK), and the like.

The exchange server 300 may be connected to the user terminal 100 and the HSM management server 200 through a network, thereby managing the third participating account of the multi-signature security account, and may be configured as any of various types of terminals such as desktop PCs, notebook PCs, server systems, and the like, and may be configured to include a database 310.

In addition, the exchange server 300 transfers cryptocurrency between user accounts by performing transaction for cryptocurrency between a plurality of users.

That is, the exchange server 300 receives multi-signature information from the HSM management server 200 and then performs transfer of assets in response to a request for transfer of assets from the multi-signature security account, which is received from the user terminal 100.

In addition, the exchange server 300 may request tasks such as transfer of assets stored in the multi-signature security account, delegation of authority for transfer of assets and change of configuration/cancellation of delegation, producer voting, checking balances, displaying a transaction list, obtaining bid information, purchase and sale of goods, permission control, submission/execution of proposals, review/approval/rejection of proposals, and the like through the third participating account.

In addition, if the third participating account is attacked (or hacked), the exchange server 300 may request the HSM management server 200 to switch the authority to a new third participating account due to the attack.

The following describes a process of using a multi-signature security account.

First, if the user terminal 100 performs membership registration in the HSM management server 200 (S100), the exchange server 300 performs authentication of user information (S120) using user information transmitted from the HSM management server 200 (S110), and assigns a GUID to each user (S130), thereby transmitting the same to the HSM management server 200 and the user terminal 100 (S140).

That is, after performing a contract and registration process such as confidentiality or the like between the first participating account, the second participating account, and the third participating account, using the administrator API, exchanging a shared secret key, and assigning a GUID to each user, user information is added.

At this time, user information may be verified through a process including AML checking.

The generated GUID for each user is protected in the HSM of the HSM management server 200, and the signature key is mapped to a multi-signature security account.

Thereafter, if a request for transfer of assets is received from the user terminal 100 (S200), the HSM management server 200 generates a multi-signature for a multi-signature security account (S210), and requests the user terminal 100 to confirm the multi-signature (S220). If approval of the multi-signature is confirmed (S230), the transfer of assets is executed (S240).

Meanwhile, if a request for recovery of the account is received from the user terminal 100 when the first participating account of the multi-signature security account is attacked (S300), the HSM management server 200 identifies the user and then generates multiple signatures for switching to a new first participating account and recovery of authority for the new account through confirmation of the user's intention by user authentication (S310).

The generated multiple signatures are transmitted to the exchange server 300, thereby performing a confirmation process (S320).

If the approval is confirmed by the exchange server 300 (S330), the HSM management server 200 approves the recovery of the multi-signature security account including the new first participating account (S340), and transmits the result thereof to the user terminal 100 (S350).

Accordingly, it is possible to improve security by managing control and recovery of a security account through a plurality of account signatures for a multi-signature security account including at least three different accounts.

As described above, although the present disclosure has been described with reference to a preferred embodiment thereof, it will be understood that the present disclosure may be variously modified and changed by those skilled in the art without departing from the spirit and scope of the present disclosure described in the following claims.

In addition, reference numerals in the claims of the present disclosure are provided for clarity and convenience of description, and are not limiting. In the course of describing the embodiments, the thicknesses of lines, the sizes of components, and the like shown in the drawings may be exaggerated for clarity and convenience of description. In addition, the terms described above are defined in consideration of functions in the present disclosure, and may vary according to the intention or custom of a user and an operator, so that the terms are to be interpreted on the basis of the description throughout this specification.

REFERENCE NUMERALS

100: User terminal
200: HSM management server
210: Offline HSM
220: Database
300: Exchange server
310: Database

The invention claimed is:

1. A multi-signature security account control system comprising:

an offline hardware security module (HSM) configured to generate a private key and a public key offline for a second participating account of a multi-signature security account in which at least three participating accounts have management authority;

wherein the participating accounts comprise a first participating account corresponding to a user terminal, a second participating account corresponding to an HSM management server, and a third participating account corresponding to an exchange server, wherein the HSM management server is configured to receive the generated private key and public key from the offline HSM, store the private key in the database, generate a key encryption key (KeK) and a data key (DK), encrypt the data key using the KeK, and store the same in the database, and output signature information encrypted using the data key, wherein the database is configured to store the private key, the KeK, and the data key (DK), wherein the HSM management server configures a multi-signature security account in which the second participating account, the first participating account of the user terminal, and the third participating account of the exchange server have management authority, and determines the shares of the multi-signature security account through weights held by the participating subjects, and wherein the HSM management server controls management authority for a certain account through authentication of multi-signature information where a sum of the shares allocated to the first to third participating accounts exceeds a predetermined reference value.

2. The multi-signature security account control system of claim 1, wherein authority of the multi-signature security account is at least one of transfer of assets, delegation of authority for transfer of assets and change of configuration/cancellation of delegation, producer votes, checking balances, displaying a transaction list, obtaining bid information, purchase and sale of goods, permission control, submission/execution of proposals, and review/approval/rejection of proposals.

3. The multi-signature security account control system of claim 1, wherein the multi-signature security account is configured to, if any one of a plurality of participating accounts is attacked, switch authority of the attacked participating account to a new participating account through authentication of remaining participating accounts of the plurality of participating accounts.

4. The multi-signature security account control system of claim 1, wherein if any one of the first participating account or the third participating account is attacked (or hacked), the HSM management server performs control so as to switch authority of the attacked account to a new account through a predetermined verification process.

* * * * *